United States Patent
Takahashi et al.

(10) Patent No.: US 10,019,967 B2
(45) Date of Patent: Jul. 10, 2018

(54) IMAGE PROCESSING APPARATUS, SOURCE DEVICE, IMAGE PROCESSING SYSTEM, IMAGE PROCESSING METHOD, AND PROGRAM FOR COMBINING IMAGES

(71) Applicant: Sony Corporation, Tokyo (JP)

(72) Inventors: Takumi Takahashi, Kanagawa (JP); Nobuyuki Asakura, Tokyo (JP); Etsuro Yamauchi, Tokyo (JP); Junya Kameyama, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 266 days.

(21) Appl. No.: 14/205,402

(22) Filed: Mar. 12, 2014

(65) Prior Publication Data
US 2014/0285515 A1    Sep. 25, 2014

(30) Foreign Application Priority Data

Mar. 22, 2013  (JP) ................. 2013-060025

(51) Int. Cl.
| | |
|---|---|
| *G09G 5/377* | (2006.01) |
| *G09G 5/02* | (2006.01) |
| *G09G 5/14* | (2006.01) |
| *H04N 1/387* | (2006.01) |
| *H04N 9/76* | (2006.01) |
| *H04N 21/431* | (2011.01) |

(52) U.S. Cl.
CPC ............ *G09G 5/377* (2013.01); *G09G 5/026* (2013.01); *G09G 5/14* (2013.01); *H04N 1/387* (2013.01); *H04N 9/76* (2013.01); *H04N 21/4318* (2013.01); *G09G 2300/0452* (2013.01)

(58) Field of Classification Search
None
See application file for complete search history.

(56) References Cited

U.S. PATENT DOCUMENTS

| | | | |
|---|---|---|---|
| 2008/0084501 A1* | 4/2008 | Miyauchi | H04N 21/4884 348/452 |
| 2009/0003601 A1* | 1/2009 | Hardy | G09C 5/00 380/243 |
| 2011/0249901 A1* | 10/2011 | Zhong | G06T 5/20 382/199 |
| 2012/0154530 A1* | 6/2012 | Yamada | H04N 13/007 348/43 |
| 2012/0293565 A1* | 11/2012 | Mito | G09G 3/3406 345/690 |

* cited by examiner

Primary Examiner — Barry Drennan
Assistant Examiner — Diana Hickey
(74) Attorney, Agent, or Firm — Wolf, Greenfield & Sacks, P.C.

(57) ABSTRACT

There is provided an image processing apparatus including an image reception unit configured to receive an image with markers including a sub image and marker pixels each indicating, using a pixel value, a combining ratio of a main image and the sub image that is combined with the main image, a combining ratio acquisition unit configured to acquire the combining ratio indicated by a pixel value of the marker pixel in the image with markers, and a combining unit configured to combine the main image and the sub image based on the acquired combining ratio.

8 Claims, 20 Drawing Sheets

| α VALUE (COMBINING RATIO) | MARKER VALUE (PIXEL VALUE) |
|---|---|
| α1 | M1 |
| α2 | M2 |
| α3 | M3 |
| ⋮ | ⋮ |

FIG. 6
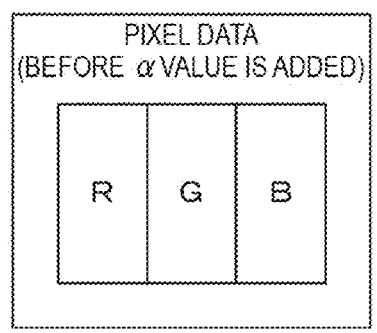
a
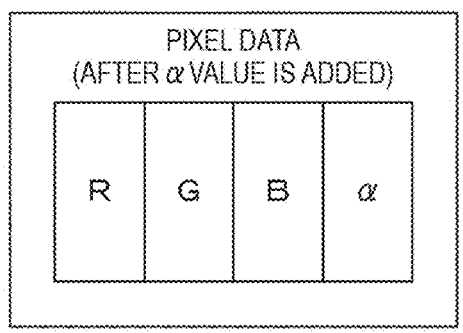
b

FIG. 15
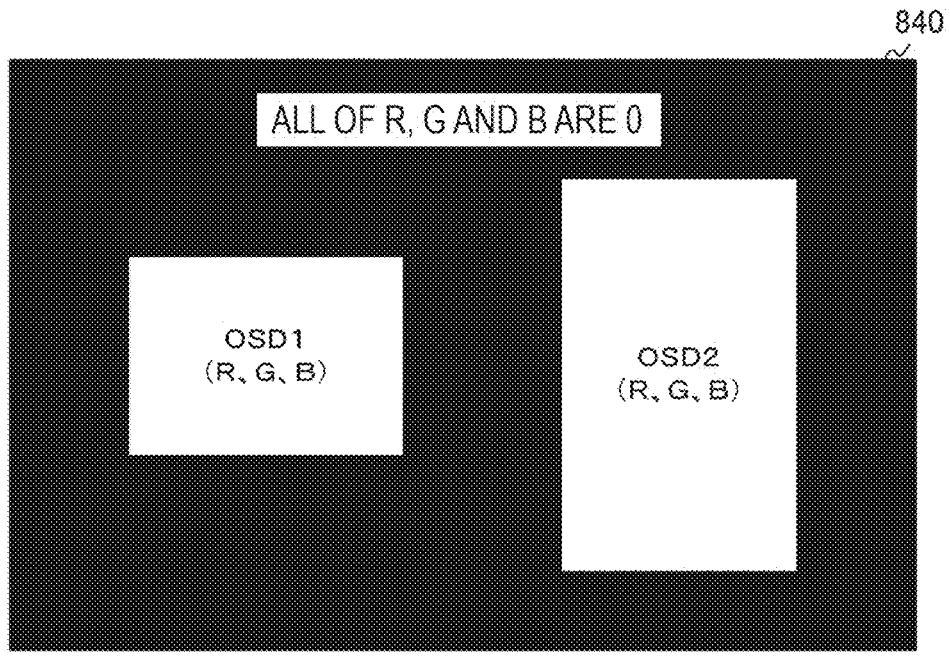
a
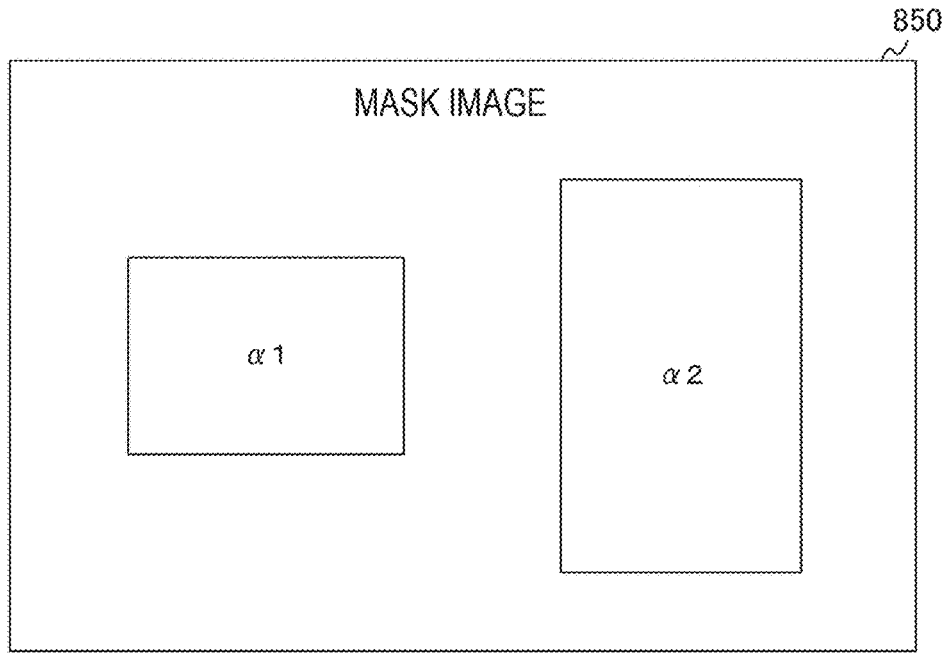
b

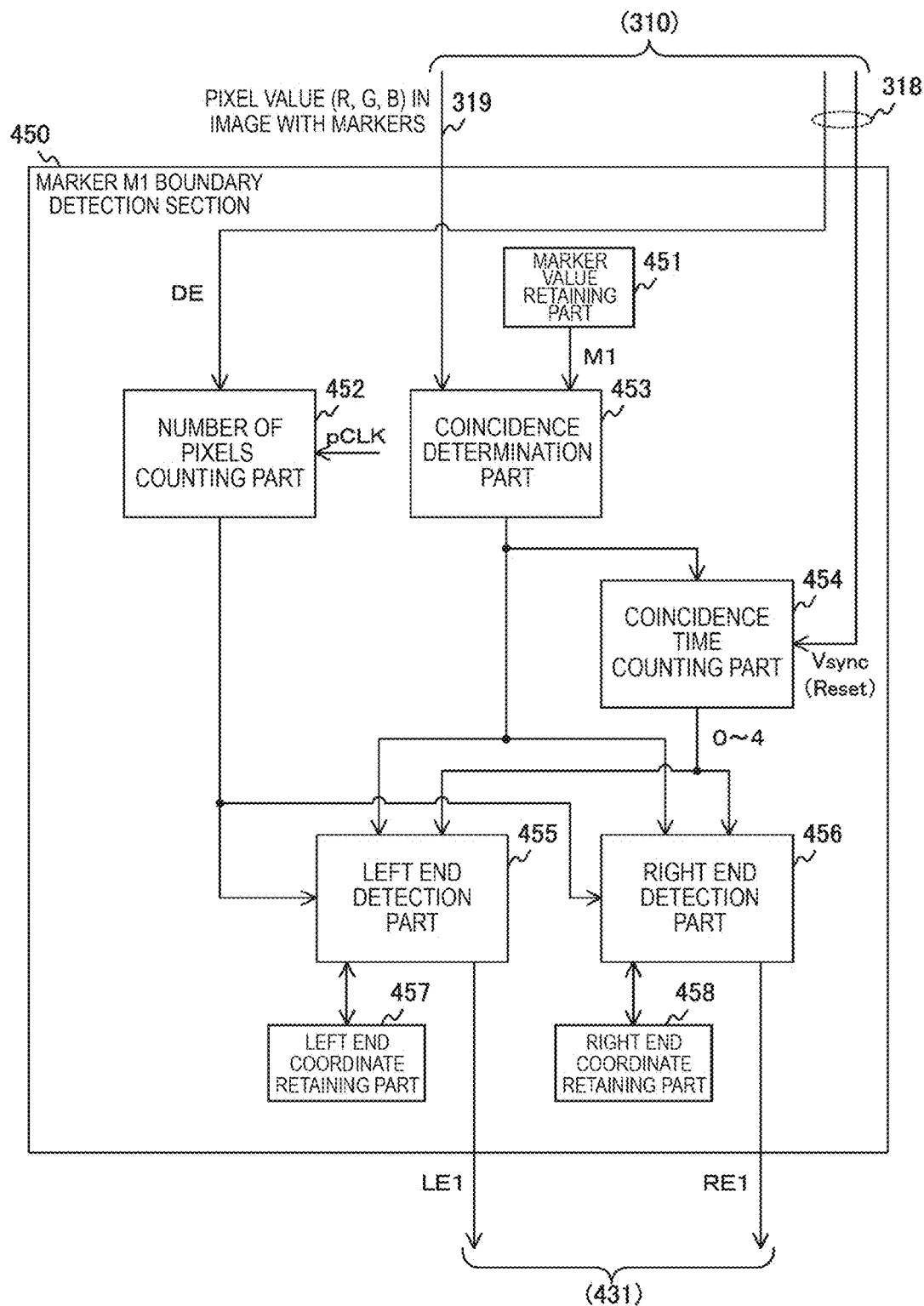

FIG. 19

| NUMBER OF TIMES OF COINCIDENCE | COINCIDENCE DETERMINATION RESULT | OPERATION OF LEFT END DETECTION PART |
|---|---|---|
| 0 | 0 | OUTPUT LE1 OF LOW LEVEL |
| 0 | 1 | RETAIN COUNT VALUE OF NUMBER OF PIXELS AS LEFT END COORDINATES AND OUTPUT LE1 OF HIGH LEVEL |
| 1 | 0/1 | OUTPUT LE1 OF LOW LEVEL |
| 2 | 0 | OUTPUT LE1 OF HIGH LEVEL WHEN COUNT VALUE OF NUMBER OF PIXELS COINCIDES WITH LEFT END COORDINATES |
| 2 | 1 | INITIALIZE LEFT END COORDINATES AND OUTPUT LE1 OF HIGH LEVEL |
| 3 | 0/1 | OUTPUT LE1 OF LOW LEVEL |
| 4 | 0/1 | OUTPUT LE1 OF LOW LEVEL |

FIG. 20

| NUMBER OF TIMES OF COINCIDENCE | COINCIDENCE DETERMINATION RESULT | OPERATION OF RIGHT END DETECTION PART |
|---|---|---|
| 0 | 0/1 | OUTPUT RE1 OF LOW LEVEL |
| 1 | 0 | OUTPUT RE1 OF LOW LEVEL |
| 1 | 1 | RETAIN COUNT VALUE OF NUMBER OF PIXELS AS RIGHT END COORDINATES AND OUTPUT RE1 OF HIGH LEVEL |
| 2 | 0/1 | OUTPUT RE1 OF HIGH LEVEL WHEN COUNT VALUE OF NUMBER OF PIXELS COINCIDES WITH RIGHT END COORDINATES |
| 3 | 0 | OUTPUT RE1 OF LOW LEVEL |
| 3 | 1 | RESET RIGHT END COORDINATES AND OUTPUT RE1 OF HIGH LEVEL |
| 4 | 0/1 | OUTPUT RE1 OF LOW LEVEL |

IMAGE PROCESSING APPARATUS, SOURCE DEVICE, IMAGE PROCESSING SYSTEM, IMAGE PROCESSING METHOD, AND PROGRAM FOR COMBINING IMAGES

CROSS REFERENCE TO RELATED APPLICATIONS

This application claims the benefit of Japanese Priority Patent Application JP 2013-060025 filed Mar. 22, 2013, the entire contents of which are incorporated herein by reference.

BACKGROUND

The present technology relates to an image processing apparatus, a source device, an image processing system, an image processing method, and a program. To be specific, the present disclosure relates to an image processing apparatus, a source device, an image processing system, an image processing method, and a program for combining a plurality of images.

An OSD (On Screen Display) function has been used in the past to set horizontal or vertical adjustment of a position, correction of distortion, contrast, brightness, and the like of a display. The OSD function is a function for performing settings and the like using a displayed OSD image, which is used in settings of a display and the like, by combining the OSD image with a main image of the display.

When the OSD image is combined with the main image, a technique that is called alpha blending, in which a coefficient that is called an α value is defined as a combining ratio and image combining is performed based on the combining ratio, is used in many cases. In the alpha blending, for example, an OSD image is combined with a main image in a mask process in which a mask image of which a combining ratio is indicated by a pixel value is used. Alternatively, a technique in which an OSD image of which a combining ratio is added to each pixel is generated, an image processing apparatus detects the combining ratio from the OSD image, and then the OSD image is combined with a main image is used.

In order to realize the OSD function using the alpha blending, an image processing apparatus in which an OSD generator and an OSD superimposing circuit are included, and the OSD generator generates an OSD image and a combining ratio and then transmits the image and the combining ratio to the OSD superimposing circuit has been proposed (for example, refer to JP 2004-101924A). The OSD superimposing circuit superimposes (in other words, combines) the OSD image on a main image based on the combining ratio from the OSD generator.

SUMMARY

However, in the technologies of the related art described above, there is concern that combining an OSD image is difficult. The OSD generator described above adds the combining ratio to each of the pixels of the OSD image and transmits the image and the combining ratio to the OSD superimposing circuit. For this reason, as resolution of the OSD image or transmission frequency (in other words, a frame rate) of the OSD image increases, a data amount of the combining ratio grows. As a result, there is concern that a transmission rate of a communication interface between the OSD generator and the OSD superimposing circuit is insufficient and accordingly it is difficult to transmit the OSD image in a real-time manner. In addition, when the combining ratio is to be transmitted, extra signal lines should be prepared for transmission of the combining ratio, and thus there is more concern of costs increasing than when the combining ratio is not transmitted.

It is desirable to reduce an amount of data to be transmitted in a communication interface for transmitting an image to be combined with a main image.

According to a first embodiment of the present technology, there is provided an image processing apparatus, an image processing method, and a program for causing a computer to execute the method, the image processing apparatus including, an image reception unit configured to receive an image with markers including a sub image and marker pixels each indicating, using a pixel value, a combining ratio of a main image and the sub image that is combined with the main image, a combining ratio acquisition unit configured to acquire the combining ratio indicated by a pixel value of the marker pixel in the image with markers, and a combining unit configured to combine the main image and the sub image based on the acquired combining ratio. Accordingly, an effect of combining the sub image with the main image based on the combining ratio indicated by the pixel value of the marker pixel is exhibited.

According to the first embodiment of the present technology, the image with markers may be an image in which the sub image is disposed in a partial region within the image with markers and the marker pixels are disposed in a position for specifying the partial region. The combining ratio acquisition unit may acquire the combining ratio in the image with markers, detects the marker pixels, and specifies the partial region based on the detected position. The combining unit may combine the sub image in a region within the main image corresponding to the specified partial region. Accordingly, an effect that the partial region is specified based on the position in which the marker pixel is detected, and the sub image is combined in a region of the main image corresponding to the partial region is exhibited.

According to the first embodiment of the present technology, a pixel value of the marker pixel may be a specific value that is not used as a pixel value in the sub image. The combining ratio acquisition unit may detect, as the marker pixel, a pixel of which the pixel value coincides with the specific value in the image with markers. Accordingly, an effect that a pixel of which a pixel value coincides with a specific value is detected as a marker pixel in the image with markers is exhibited.

According to the first embodiment of the present technology, the image with markers may include the marker pixels arrayed in a row along the outer circumference of the partial region. Accordingly, an effect that the partial region is specified from the marker pixels arrayed in a row along the outer circumference of the partial region is exhibited.

According to the first embodiment of the present technology, the partial region may be a rectangular region. The marker pixels may be disposed in a plurality of corners of the partial region. Accordingly, an effect that the partial region is specified from the marker pixels disposed in the plurality of corners of the partial region is exhibited.

According to the first embodiment of the present technology, the combining ratio acquisition unit may further include a pixel interpolation section configured to interpolate pixels in the sub image in the plurality of corners. Accordingly, an effect that pixels in the sub image in the plurality of corners are interpolated is exhibited.

According to a second embodiment of the present technology, there is provided a source device including an image generation unit configured to generate an image with markers including a sub image and marker pixels each indicating, using a pixel value, a combining ratio of a main image and the sub image combined with the main image, and an image transmission unit configured to transmit the image with markers. Accordingly, an effect that the image with markers including the sub image and the marker pixels each indicating the combining ratio using the pixel value is transmitted is exhibited.

According to a third embodiment of the present technology, there is provided an image processing system including an image generation unit configured to generate an image with markers including a sub image and marker pixels each indicating, using a pixel value, a combining ratio of a main image and the sub image combined with the main image, an image transmission unit configured to transmit the image with markers, an image reception unit configured to receive the image with markers, a combining ratio acquisition unit configured to acquire the combining ratio indicated by a pixel value of the marker pixel in the image with markers, and a combining unit configured to combine the sub image with the main image based on the acquired combining ratio. Accordingly, an effect that the sub image is combined with the main image based on the combining ratio indicated by the pixel value of the marker pixel is exhibited.

According to an embodiment of the present technology, an excellent effect of being able to reduce an amount of data to be transmitted in a communication interface that transmits an image to be combined with a main image can be exhibited.

BRIEF DESCRIPTION OF THE DRAWINGS

FIG. 3 is a diagram showing a configuration example of a combining ratio conversion table according to the first embodiment;

FIG. 6 is a diagram showing an example of pixel data before and after addition of a combining ratio according to the first embodiment;

FIG. 15 is a diagram illustrating examples of an OSD image and a mask image according to a third modified example of the first embodiment;

FIG. 18 is a block diagram illustrating a configuration example of a marker M1 boundary detection unit according to the second embodiment;

FIG. 19 is a table showing an example of operations of a left end detection part according to the second embodiment; and FIG. 20 is a table showing an example of operations of a right end detection part according to the second embodiment.

DETAILED DESCRIPTION OF THE EMBODIMENT(S)

Figure 1:
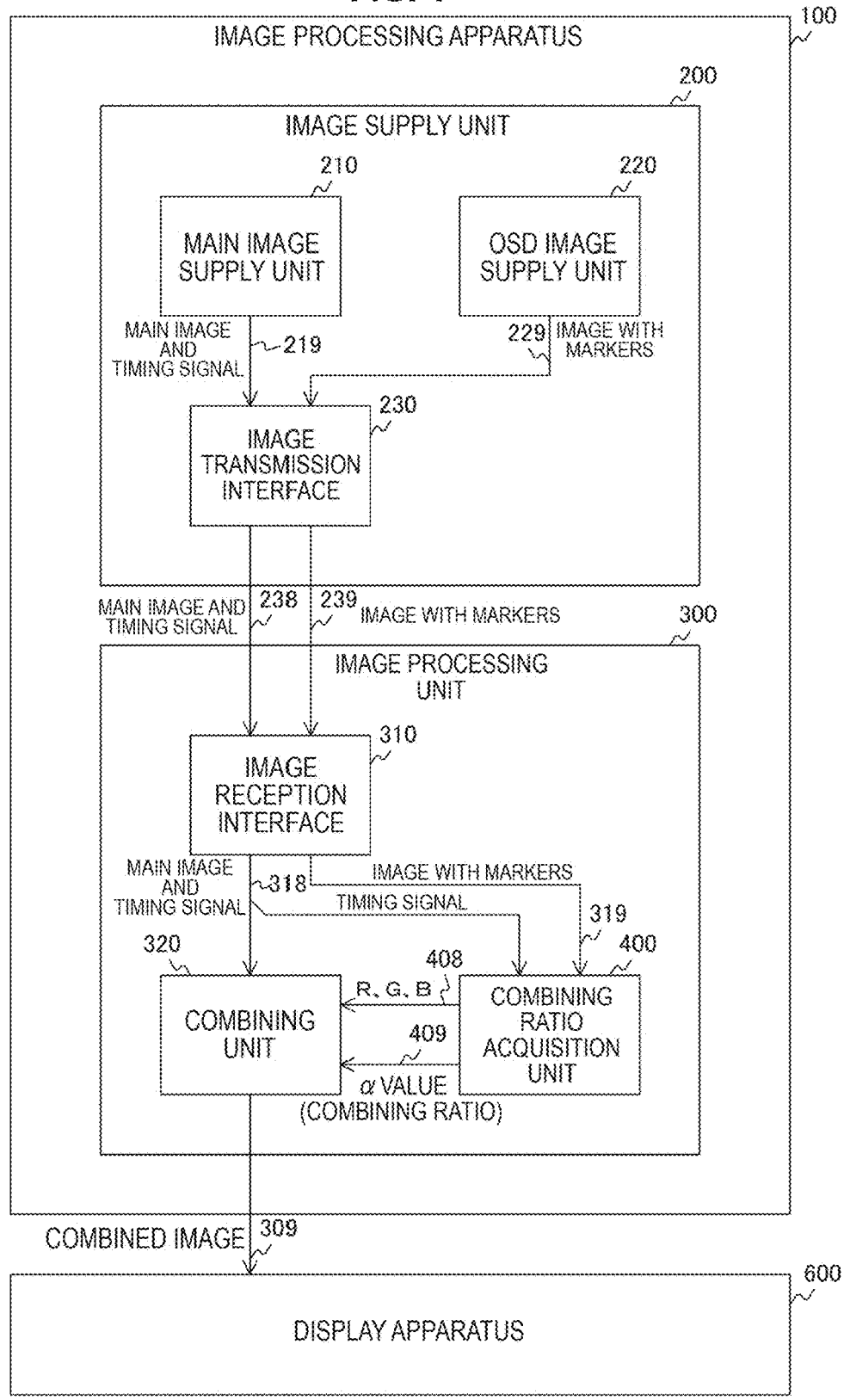
FIG. 1 is a block diagram illustrating a configuration example of an image processing system according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments for implementing the present technology (hereinafter referred to as embodiments) will be described. Description will be provided in the following order.

1. First embodiment (example in which marker pixels indicating a combining ratio using pixel values are arranged)

2. Second embodiment (example in which marker pixels indicating a combining ratio using pixel values are arranged in the four corners of an OSD image)

<1. First Embodiment>

[Configuration Example of an Image Processing System]

FIG. 1 is a block diagram illustrating a configuration example of an image processing system according to an embodiment of the present technology. The image processing system includes an image processing apparatus 100 and a display apparatus 600.

The image processing apparatus 100 processes an image and supplies the image to the display apparatus 600, and is, for example, a terrestrial digital tuner of a television receiver set or a recorder. The image processing apparatus 100 includes an image supply unit 200 and an image processing unit 300.

The image supply unit 200 generates and supplies a main image and an OSD image. The main image is an image to be combining with the OSD image. On the other hand, the OSD image is an image expressed by being combined with the main image. In addition, the main image and the OSD image are constituted by a plurality of pixels arrayed in a two-dimensional lattice shape. The image supply unit 200 includes a main image supply unit 210, an OSD image supply unit 220, and an image transmission interface 230.

The main image supply unit 210 acquires a moving image that includes a plurality of main images (frames) in a time series manner, and supplies the image to the image transmission interface 230 via a signal line 219. The main image supply unit 210 acquires the moving image from a recording device such as an HDD (Hard Disk Drive). The moving image includes timing signals in addition to the main images. The timing signals include synchronization signals and data enable signals DE. The data enable signals DE are signals indicating periods in which pixel data is valid. In addition, the synchronization signals include vertical synchronization signals Vsync indicating scanning timings in the vertical direction and horizontal synchronization signals Hsync indicating scanning timings in the horizontal direction. Note that the main image supply unit 210 may acquire moving images carried by broadcasting waves by receiving and decoding the broadcasting waves.

Here, in a cycle of a vertical synchronization signal Vsync, an image is transmitted in a period other than a vertical blanking period. In addition, in a cycle of a horizontal synchronization signal Hsync, a data enable signal is asserted in a period other than a horizontal blanking period and pixels are transmitted.

The OSD image supply unit 220 generates a plurality of OSD images (frames) and supplies the images in a time series manner. The OSD image supply unit 220 generates each of the OSD images according to operations performed by a user or the like. In addition, the OSD image supply unit 220 generates an image with markers from the OSD images. The image with markers is an image having the same size as a main image, and having a partial region therein in which an OSD image is disposed and marker pixels are disposed in positions for specifying the region (for example, the outer circumference of the OSD image). Here, a marker pixel is a pixel indicating a combining ratio (in other words, an α value) of a main image and an OSD image using a pixel value. Hereinafter, a pixel value of a marker pixel will be referred to as a "marker value." The OSD image supply unit 220 supplies a plurality of images with markers to the image transmission interface 230 via a signal line 229 in a time series manner. Note that the OSD image supply unit 220 is an example of the image generation unit described in the claims.

The image transmission interface 230 transmits each of the main images and the images with markers to the image processing unit 300. The main images are transmitted via a signal line 238 together with timing signals and the images with markers are transmitted via a signal line 239. Note that the image transmission interface 230 is an example of the image transmission unit described in the claims.

Note that, in the image supply unit 200, the main image supply unit 210 may supply the main images by setting only one frame as a still image, instead of a moving image. In addition, the OSD image supply unit 220 may also supply only one frame of the OSD images.

The image processing unit 300 performs image processes on the main images and the OSD images. The image processing unit 300 includes an image reception interface 310, a combining ratio acquisition unit 400, and a combining unit 320.

The image reception interface 310 receives the main images, the timing signals, and the images with markers. The image reception interface 310 supplies the received main images and timing signals to the combining unit 320 via a signal line 318. In addition, the image reception interface 310 supplies the timing signals and the images with markers to the combining ratio acquisition unit 400 via signal lines 318 and 319. Note that the image reception interface 310 is an example of the image reception unit described in the claims.

Here, the image transmission interface 230 and the image reception interface 310 are, for example, interfaces based on a V-by-One standard. Note that a standard of the interfaces is not limited to the V-by-One standard as long as the interfaces can transmit and receive images. For example, the interfaces may be based on an HDMI (High-Definition Multimedia Interface which is a registered trademark) standard.

The combining ratio acquisition unit 400 acquires a combining ratio indicated by a marker value of a marker pixel. The combining ratio acquisition unit 400 acquires such a combining ratio indicated by a pixel value (marker value) of a marker pixel in an image with markers. In addition, the combining ratio acquisition unit 400 specifies a region in which an OSD image is disposed based on a position of the marker pixel. The combining ratio acquisition unit 400 adds an α value corresponding to a marker value to each of pixels in a specified OSD image. The combining ratio acquisition unit 400 supplies signals of R, G, B, and the like out of pixel data of each of the pixels in the OSD image to the combining unit 320 via a signal line 408. With regard to a background region of the OSD image, the combining ratio acquisition unit 400 supplies pixel values of black levels. In addition, the combining ratio acquisition unit 400 supplies the α value in the pixel data of each of the pixels of the OSD image to the combining unit 320 via a signal line 409. With regard to the background region of the OSD image, the combining ratio acquisition unit 400 supplies an α value of the value "0."

The combining unit 320 performs image processes for combining an OSD image with a main image based on a combining ratio. The combining unit 320 acquires an α value added to each pixel, and combines the images by obtaining the weighted average of pixel values of pixels in a main image and pixel values of pixels in an OSD image using, for example, the following Formula 1.

$$P_{blend}(x,y) = \{1 - \alpha(x,y)\} \times P_{Main}(x,y) + \alpha(x,y) \times P_{OSD}(x,y) \quad \text{Formula 1}$$

In Formula 1, $P_{blend}(x, y)$ is a pixel value of a pixel with coordinates (x, y) within a combined image obtained from image combining. $\alpha(x, y)$ is an α value added to the pixel with the coordinates (x, y) within the OSD image. $P_{Main}(x, y)$ is a pixel value of a pixel with the coordinates (x, y) within the main image. $P_{OSD}(x, y)$ is a pixel value of a pixel with the coordinates (x, y) within the OSD image.

The combining unit 320 generates a combined image constituted by the pixels generated through Formula 1. In addition, the combining unit 320 executes image processes such as a noise reduction process, a white balance process, and a gamma correction process in addition to the combining process if necessary. An order in which the image processes are executed is arbitrary. The combining unit 320 outputs the processed combined image to a display apparatus 600 together with the timing signals via a signal line 309.

The display apparatus 600 displays the combined image and is, for example, a liquid crystal display, or the like.

[Configuration Example of the OSD Image Supply Unit]

Figure 2:
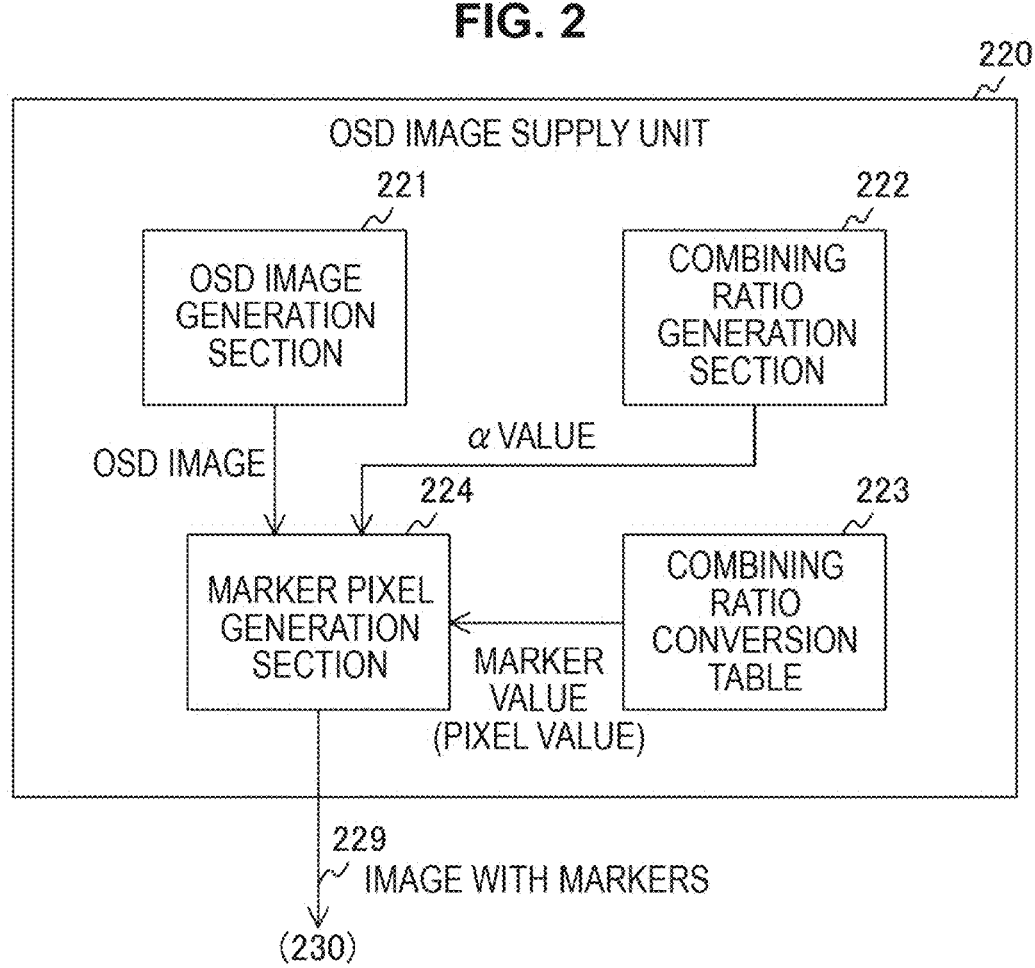
FIG. 2 is a block diagram illustrating a configuration example of an OSD image supply unit according to the first embodiment.

FIG. 2 is a block diagram illustrating a configuration example of the OSD image supply unit 220 according to the first embodiment. The OSD image supply unit 220 includes an OSD image generation section 221, a combining ratio generation section 222, a combining ratio conversion table 223, and a marker pixel generation section 224.

The OSD image generation section 221 generates an OSD image according to an operation performed by a user, or the like. The OSD image generation section 221 generates the image having the same size as a main image in which, for example, the generated OSD image is disposed. Within the image, pixel values of the background of the OSD image are set to be, for example, black levels. In addition, the OSD image generation section 221 can generate a plurality of OSD images for one main image. The OSD image generation section 221 supplies the generated image to the marker pixel generation section 224.

The combining ratio generation section 222 generates a combining ratio (in other words, an $\alpha$ value) of a main image and an OSD image. For the $\alpha$ value, a real number from 0 to 1 is set. When a plurality of OSD images are disposed within one main image, the combining ratio generation section 222 can set different $\alpha$ values for each of the OSD images. In addition, the combining ratio generation section 222 can divide one OSD image into a plurality of regions and then set different $\alpha$ values for each of the regions. The combining ratio generation section 222 supplies such a generated $\alpha$ value to the marker pixel generation section 224.

The combining ratio conversion table 223 is a table in which a plurality of $\alpha$ values and a plurality of pixel values (in other words, marker values) are associated with each other one to one. Here, for the marker values, pixel values that have not been used within an OSD image are set.

The marker pixel generation section 224 generates marker pixels indicating $\alpha$ values using pixel values. The marker pixel generation section 224 acquires marker values corresponding to $\alpha$ values from the combining ratio conversion table 223, and disposes pixels of the marker values along the outer circumference of an OSD image as marker pixels. The marker pixel generation section 224 supplies an image in which the OSD image and the marker pixels are disposed to the image transmission interface 230 as an image with markers.

[Configuration Example of the Combining Ratio Conversion Table]

FIG. 3 is a diagram showing a configuration example of the combining ratio conversion table 223 according to the first embodiment. In the combining ratio conversion table 223, different marker values are written for each of a plurality of $\alpha$ values. For example, a marker value of "M1" is written in association with an $\alpha$ value of "$\alpha$1." In addition, a marker value of "M2" is written in association with an $\alpha$ value of "$\alpha$2."

Figure 4:
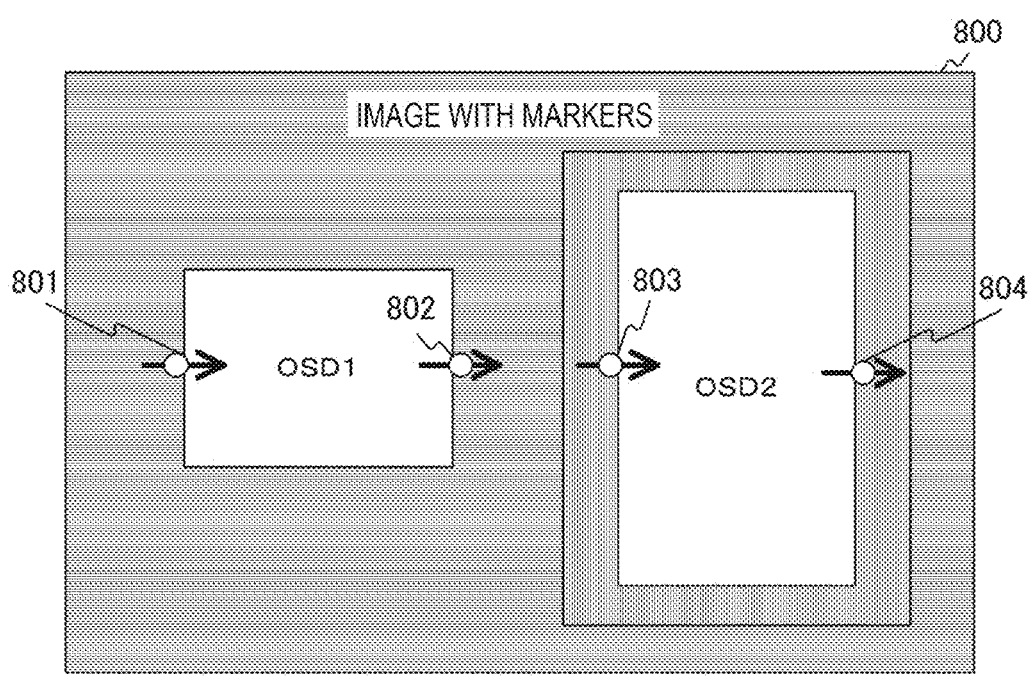
FIG. 4 is a diagram illustrating an example of an image with markers according to the first embodiment.

FIG. 4 is a diagram illustrating an example of an image with markers 800 according to the first embodiment. In the image with markers 800, an OSD 1 and an OSD 2 are disposed as OSD images. Marker pixels of the marker value M2 are disposed around the OSD 2. In the same drawing, the region with vertical stripes indicates a region in which the marker pixels of the marker value M2 are disposed.

In the image with markers 800, marker pixels of the marker value M1 are disposed in the remaining region other than the region in which the OSD 1 and the OSD 2 are disposed and the region in which the marker pixels of the marker value M2 are disposed. In other words, the marker pixels of the marker value M1 are disposed around the OSD 1. In the same drawing, the region with horizontal stripes indicates a region in which the marker pixels of the marker value M1 are disposed.

A plurality of pixels arrayed in the image with markers 800 in the horizontal direction are hereinafter referred to as a "horizontal line." The image with markers 800 includes a number of horizontal lines corresponding to the level of resolution thereof, and each of the horizontal lines is sequentially transmitted to the image processing unit 300 in synchronization with the horizontal synchronization signal Hsync.

The image processing unit 300 receives each of the horizontal lines in order from the image supply unit 200, and performs a process (in other words, scanning) for determining whether or not pixel values of the pixels included in the horizontal lines are marker values in order. For example, the pixels from the left end to the right end of the horizontal lines are scanned in order.

The image processing unit 300 compares results of scanning of the previous time and scanning of this time, and detects a position in which the results are changed as the left end or the right end of the OSD images. For example, in scanning of a pixel 801 that is adjacent to the left end of the OSD 1, a pixel value thereof coincides with the marker value M1, however, in scanning of the next pixel (in other words, the pixel at the left end), a pixel value thereof does not coincide with the marker value M1. In this manner, the pixel value coincides with the marker value in the scanning of the previous time, however, when the values do not coincide in the scanning of this time, the image processing unit 300 detects the left end of the OSD image.

In addition, in scanning of a pixel at the right end of the OSD 1, a pixel value thereof does not coincide with the marker value M1, however, in scanning of the next pixel 802, a pixel value thereof coincide with the marker value M1. In this manner, when the pixel value does not coincide with the marker value in the scanning of the previous time and the pixel value coincides with the value in the scanning of this time, the image processing unit 300 detects the right end of the OSD image.

In the same manner, the left end and the right end of the OSD 2 are detected from a result of determination of whether a pixel value coincides with the marker value M2.

The image processing unit 300 adds $\alpha$ values corresponding to marker values for each of pixels from the left end to the right end of a horizontal line of which the left end and the right end have been detected. For other pixels, an $\alpha$ value of the value "0" is set. Accordingly, the $\alpha$ values are added to each of the pixels within the OSD images.

[Configuration Example of the Combining Ratio Acquisition Unit]

Figure 5:
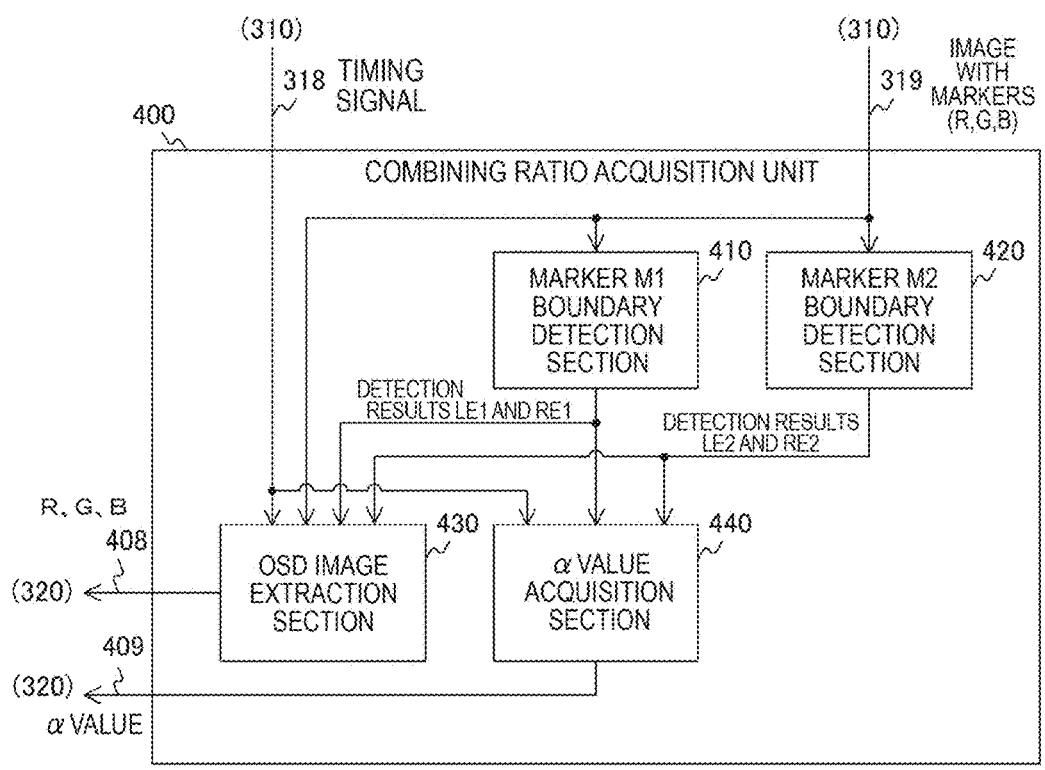
FIG. 5 is a block diagram illustrating a configuration example of a combining ratio acquisition unit according to the first embodiment.

FIG. 5 is a block diagram illustrating a configuration example of the combining ratio acquisition unit 400 according to the first embodiment. The combining ratio acquisition unit 400 includes a marker M1 boundary detection section 410, a marker M2 boundary detection section 420, an OSD image extraction section 430, and an $\alpha$ value acquisition section 440.

The marker M1 boundary detection section 410 detects a boundary of an OSD image based on whether or not the marker M1 coincides with a pixel value. To be specific, the marker M1 boundary detection section 410 receives each of horizontal lines of an image with markers in order. Then, the marker M1 boundary detection section 410 performs a process (scanning) for determining whether or not a pixel value of each of pixels of the horizontal lines coincides with the marker value M1 in order. When a pixel value coincides with the marker value in scanning of the previous time but does not coincide with the marker value in scanning of this time, the marker M1 boundary detection section 410 sets a detection result LE1 of a left end to be a high level. Otherwise, the detection result LE1 is set to be a low level.

On the other hand, when a pixel value does not coincide with the marker value in scanning of the previous time but coincides with the marker value in scanning of this time, the marker M1 boundary detection section 410 sets a detection result RE1 of a right end to be a high level. Otherwise, the detection result RE1 is set to be a low level.

The marker M1 boundary detection section 410 supplies the detection results LE1 and RE1 to the OSD image extraction section 430 and the α value acquisition section 440.

A configuration of the marker M2 boundary detection section 420 is the same as the marker M1 boundary detection section 410 except that the left end and right end are detected based on the marker value M2 instead of the marker value M1.

The OSD image extraction section 430 extracts an OSD image from an image with markers. The OSD image extraction section 430 receives each image with markers in synchronization with the vertical synchronization signal Vsync, and receives each of horizontal lines in synchronization with the horizontal synchronization signal Hsync. In addition, the OSD image extraction section 430 receives detection results of the marker M1 boundary detection section 410 and the marker M2 boundary detection section 420. With regard to each of the horizontal lines in an image with markers, the OSD image extraction section 430 extracts pixels from the left end to the right end indicating detection results as pixels of an OSD image, and supplies pixel values thereof to the combining unit 320. With regard to remaining pixels, the OSD image extraction section 430 supplies pixel values of a black level. The pixel values include signals of, for example, R (Red), G (Green), and B (Blue).

The α value acquisition section 440 acquires α values corresponding to marker values in an image with markers. The α value acquisition section 440 acquires and outputs the α values for each of pixels in horizontal lines in synchronization with the horizontal synchronization signal Hsync. To be specific, in a cycle of the horizontal synchronization signal Hsync, the α value acquisition section 440 outputs α1 corresponding to the marker value M1 to the combining unit 320 from when the detection result LE1 is set to be a high level to when the detection result RE1 is set to be a high level for the first time. In a cycle of the horizontal synchronization signal Hsync, even when the detection result LE1 is set to be a high level two or more times, α1 is no longer output thereafter.

In addition, in a cycle of the horizontal synchronization signal Hsync, the α value acquisition section 440 outputs α2 corresponding to the marker value M2 from when the detection result LE2 is set to be a high level to when the detection result RE2 is set to be a high level for the first time. When the condition for outputting α1 or α2 is not met, the α value is set to be "0."

Note that the combining ratio acquisition unit 400 includes the two boundary detection sections of the marker M1 boundary detection section 410 and the marker M2 boundary detection section 420, however, three or more boundary detection sections may be included.

FIG. 6 is a diagram showing an example of pixel data before and after addition of a combining ratio according to the first embodiment. Note that a of the drawing is a diagram showing an example of pixel data of pixels within an image with markers. An α value is not added to the pixel data, and the pixel data includes, for example, R, G, and B signals. The R, G, and B signals are each, for example, 8-bit data. Note that a format of the pixel data is not limited to the R, G, and B signals. The pixel data may include, for example, a luminance signal and a color-difference signal.

b of FIG. 6 is a diagram showing an example of pixel data of pixels within an OSD image output by the α value acquisition section 440. An α value is added to the pixel data, and the pixel data includes, for example, R, G, and B signals and the α value. The α value is expressed as, for example, 8 bits. As a result, a data amount of one piece of the pixel data is 24 bits to 32 bits.

Figure 7:
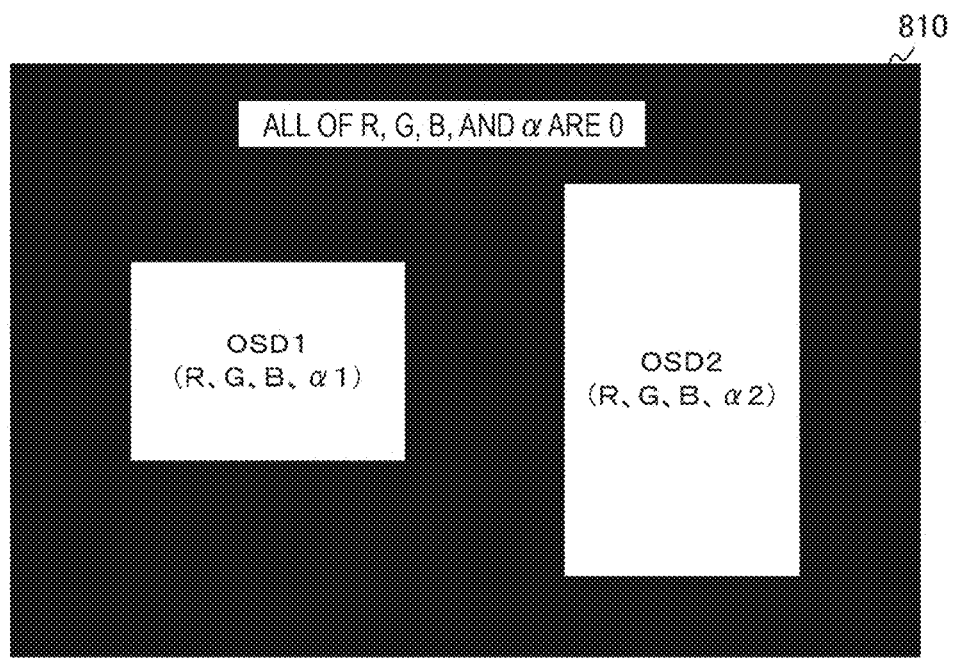
FIG. 7 is a diagram showing an example of OSD images to which a combining ratio is added according to the first embodiment.

FIG. 7 is a diagram showing an example of OSD images in which a combining ratio is added according to the first embodiment. An image 810 in the drawing is an image having the same size as a main image, and OSD images of the OSD 1 and the OSD 2 are disposed in partial regions of the image. Pixels of the backgrounds of the OSD images are pixels of a black level. In the image 810, the α value acquisition section 440 adds α1 to each pixel within the OSD 1, adds α2 to each pixel within the OSD 2, and then supplies the image to the combining unit 320. In addition, an α value of "0" is set for the backgrounds of the OSD images. Since such images in which the α values are added as described above are generated in the image processing unit 300, an image with markers in which an α value is not added is transmitted and received between the image supply unit 200 and the image processing unit 300 as described above. For this reason, an amount of transmitted data between interfaces is reduced in comparison to the case in which an image in which α values are added is transmitted and received between the image supply unit 200 and the image processing unit 300. In addition, it is not necessary to provide a signal line for transmitting and receiving α values between the image supply unit 200 and the image processing unit 300.

[Configuration Example of the Marker M1 Boundary Detection Section]

Figure 8:
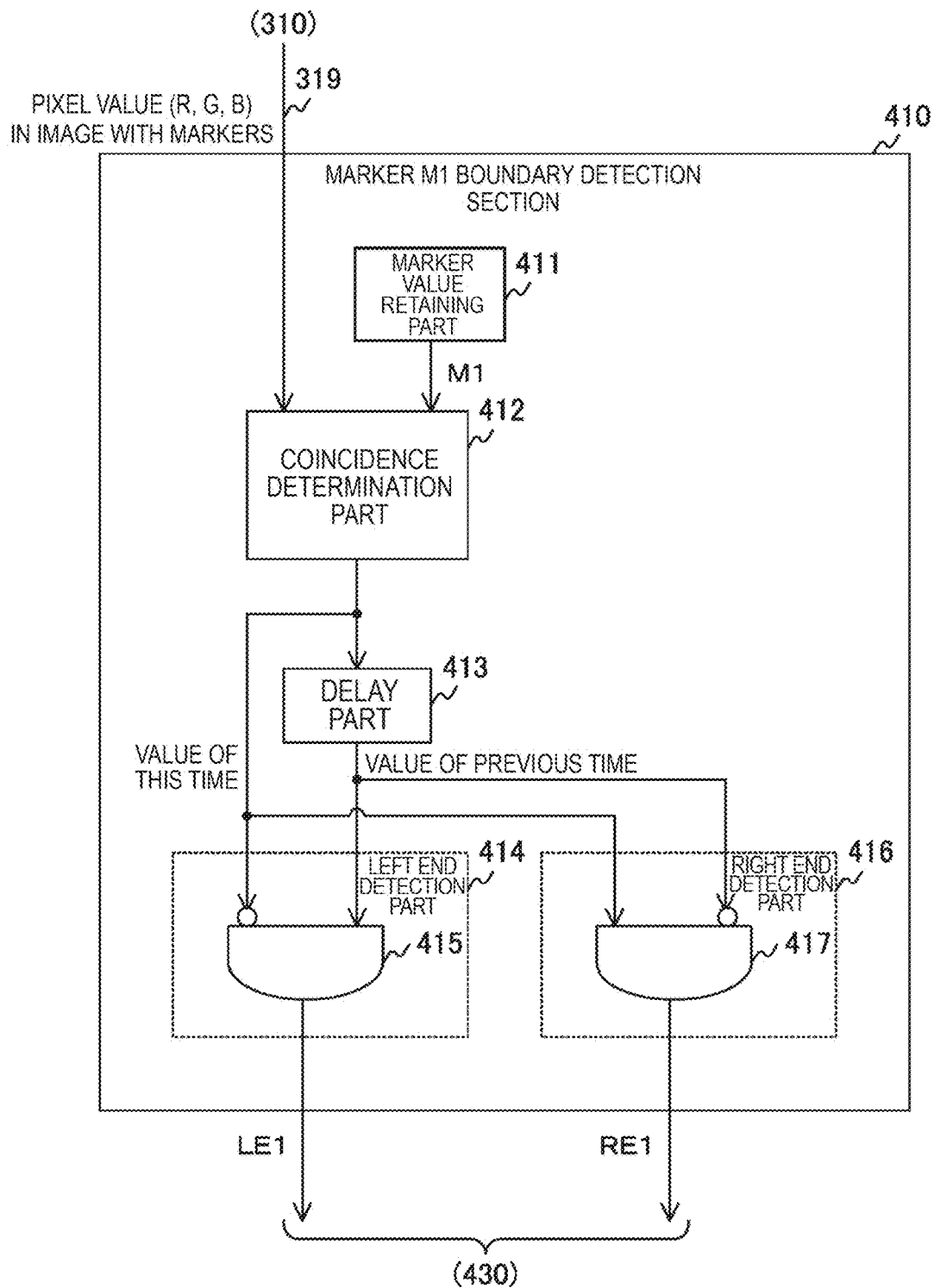
FIG. 8 is a block diagram illustrating a configuration example of a marker M1 boundary detection section according to the first embodiment.

FIG. 8 is a block diagram illustrating a configuration example of the marker M1 boundary detection section 410 according to the first embodiment. The marker M1 boundary detection section 410 includes a marker value retaining part 411, a coincidence determination part 412, a delay part 413, a left end detection part 414, and a right end detection part 416.

The marker value retaining part 411 retains the marker value M 1. The coincidence determination part 412 determines whether or not each of pixel values of pixels within an image with markers coincides with the marker value M1. The coincidence determination part 412 supplies a coincidence determination result of each of the pixels to the delay part 413, the left end detection part 414, and the right end detection part 416 as a value of this time. When the pixel value coincides with the marker value M1, for example, the value "1" is set, and when the pixel value does not coincide with the marker value, the value "0" is set as a coincidence determination result.

The delay part 413 causes a coincidence determination result to be delayed one pixel. The delayed coincidence determination result is supplied to the left end detection part 414 and the right end detection part 416 as the previous value.

The left end detection part 414 detects the left end of an OSD image. The left end detection part 414 includes a logical gate 415. The logical gate 415 supplies a logical AND of a value obtained by inverting a value of this time and a value of the previous time of a coincidence determination result. The logical gate 415 supplies the logical AND to the OSD image extraction section 430 as the left end detection result LE1.

The right end detection part 416 detects the right end of an OSD image. The right end detection part 416 includes a logical gate 417. The logical gate 417 supplies a logical AND of a value of this time and a value obtained by inverting a value of the previous time of the coincidence determination result. The logical gate 417 supplies the logical AND to the OSD image extraction section 430 as the right end detection result RE1.

Note that the left end detection part 414 may include an inversion gate for inverting the value of this time and a logical AND gate that outputs a logical AND of an output value of the inversion gate and the value of the previous time, instead of the logical gate 415. In the same manner, the right end detection part 416 may include an inversion gate and a logical AND gate instead of the logical gate 417.

[Configuration Example of the α Value Acquisition Section]

Figure 9:
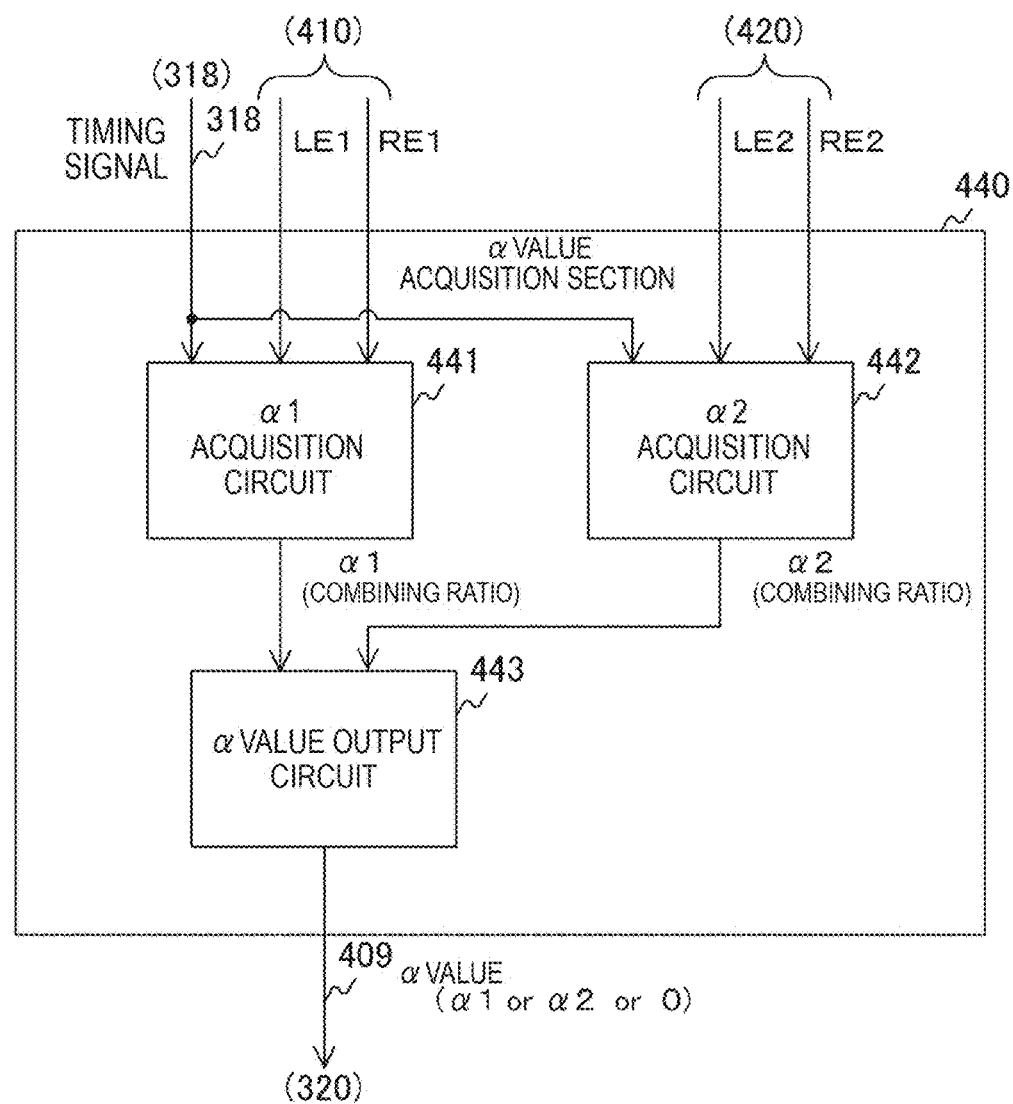
FIG. 9 is a block diagram illustrating a configuration example of an α value acquisition section according to the first embodiment.

FIG. 9 is a block diagram illustrating a configuration example of the α value acquisition section 440 according to the first embodiment. The α value acquisition section 440 includes an α1 acquisition circuit 441, an α2 acquisition circuit 442, and an α value output circuit 443. The α1 acquisition circuit 441 supplies α1 to the α value output circuit 443 from when the detection result LE1 is set to be a high level to when the detection result RE1 is set to be a high level for the first time in a cycle of the horizontal synchronization signal Hsync.

The α2 acquisition circuit 442 supplies α2 to the α value output circuit 443 from when the detection result LE2 is set to be a high level to when the detection result RE2 is set to be a high level for the first time in a cycle of the horizontal synchronization signal Hsync.

The α value output circuit 443 outputs any α value of the values α1, α2, and "0." The α value output circuit 443 outputs α1 while the α1 acquisition circuit 441 outputs α1, outputs α2 while the α2 acquisition circuit 442 outputs α2, and outputs the cc value "0" in other periods.

Note that a configuration of the α value output circuit 443 is based on the premise that the image supply unit 200 does not generate an image with markers on which an OSD image corresponding to α1 and another OSD image corresponding to α2 are not superimposed. However, the image supply unit 200 may generate an image with markers in which such OSD images are disposed in a superimposing manner. In this case, a part of a period in which the α1 acquisition circuit 441 outputs α1 overlaps a part of a period in which the α2 acquisition circuit 442 outputs α2. In such a case, the α value output circuit 443 preferentially outputs any of α1 and α2. For example, a higher value of α1 or α2 is preferentially output.

In addition, the α value acquisition section 440 includes two α value acquisition circuits of the α1 acquisition circuit 441 and the α2 acquisition circuit 442, however, the α value acquisition section may include three or more α value acquisition circuits.

[Configuration Example of the Image Processing Apparatus]

Figure 10:
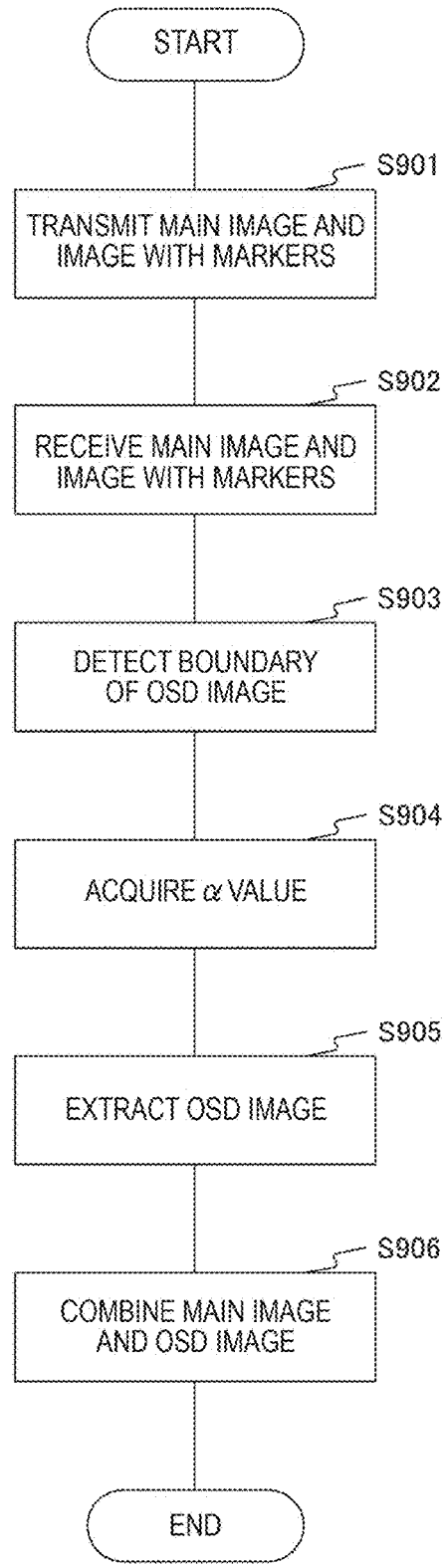
FIG. 10 is a flowchart showing an example of an operation of an image processing apparatus according to the first embodiment.

FIG. 10 is a flowchart showing an example of an operation of the image processing apparatus 100 according to the first embodiment. This operation starts when, for example, an output of a combined image is instructed to the image processing apparatus 100.

The image supply unit 200 inside the image processing apparatus 100 generates a main image and an image with markers and transmits the images to the image processing unit 300 (Step S901). The image processing unit 300 inside the image processing apparatus 100 receives the main image and the image with markers (Step S902).

The image processing unit 300 detects a boundary of an OSD image based on a determination result of whether or not a marker value and a pixel value coincide with each other (Step S903). The image processing unit 300 acquires an α value corresponding to the marker value (Step S904). The image processing unit 300 extracts the OSD image from the image with markers based on the detection result of the boundary of the OSD image (Step S905). Then, the image processing unit 300 combines the OSD image with the main image based on the acquired α value and then outputs the combined image (Step S906). After Step S906, the image processing unit 300 terminates the operation of outputting the combined image.

Figure 11:
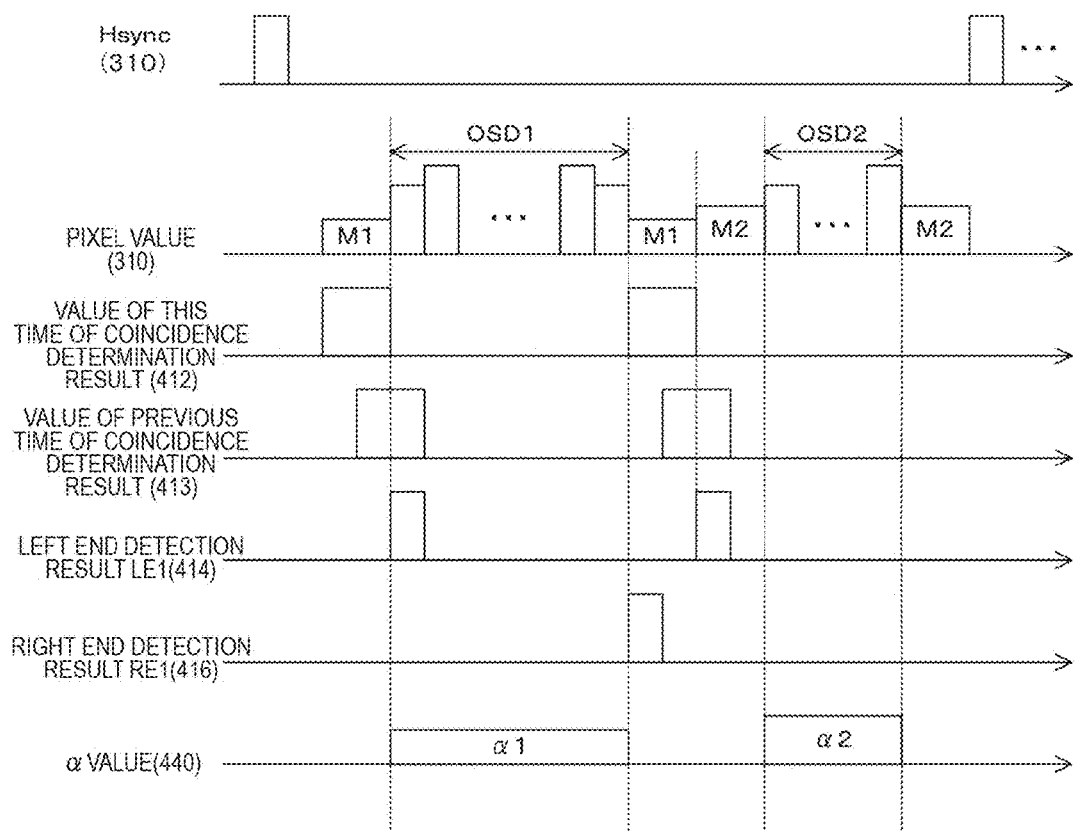
FIG. 11 is a timing chart showing an example of an operation of the combining ratio acquisition unit according to the first embodiment.

FIG. 11 is a timing chart showing an example of an operation of the combining ratio acquisition unit 400 according to the first embodiment. The image reception interface 310 receives pixel values of each of pixels in horizontal lines inside the image with markers in a cycle of the horizontal synchronization signal Hsync.

The coincidence determination part 412 determines whether or not each pixel value coincides with the marker value M1 for each of the pixels. Since the marker value of the marker value M1 is disposed on the left or right side of the OSD 1 of the OSD image and the pixel value coincides with the marker value M1, the value of this time of the coincidence determination result is "1." On the other hand, since the pixel value does not coincide with the marker value M1 in the OSD image, the value of this time is "0." In addition, since the value of the previous time of the coincidence determination result is a value obtained by delaying the value of this time in the delay part 413, the value is "1" at the left end of the OSD image and "0" within the OSD image other than at the left end.

The left end detection part 414 sets the detection result LE1 of the left end to be a high level when the value of the previous time is "1" and the value of this time is "0." In addition, the right end detection part 416 sets the detection result RE1 of the right end to be a high level when the value of the previous time is "0" and the value of this time is "1."

The α value acquisition section 440 outputs α1 from when the detection result LE1 is set to be a high level to when the detection result RE1 is set to be a high level for the first time. In addition, the α value acquisition section 440 outputs α2 from when the detection result LE2 is set to be a high level to when the detection result RE2 is set to be a high level for the first time. In other periods, the α value of "0" is output.

Note that, when a marker pixel of the marker value M2 is disposed adjacent to the right of a marker pixel of the marker value M1 on the right side of the OSD 1 of the OSD image, the value of this time is "0" and the value of the previous time is "1" in the position of the marker pixel of the marker value M2. For this reason, the detection result LE1 is set to be a high level again, and a second left end is detected. However, since the left end is not the left end detected the first time, α1 is not output.

As described above, according to the first embodiment of the present technology, since the image processing unit 300 acquires a combining ratio indicated by a pixel value of a marker pixel in a received image, it is not necessary to receive the combining ratio, and accordingly, a data amount of the received image can be reduced.

[First Modified Example]

Figure 12:
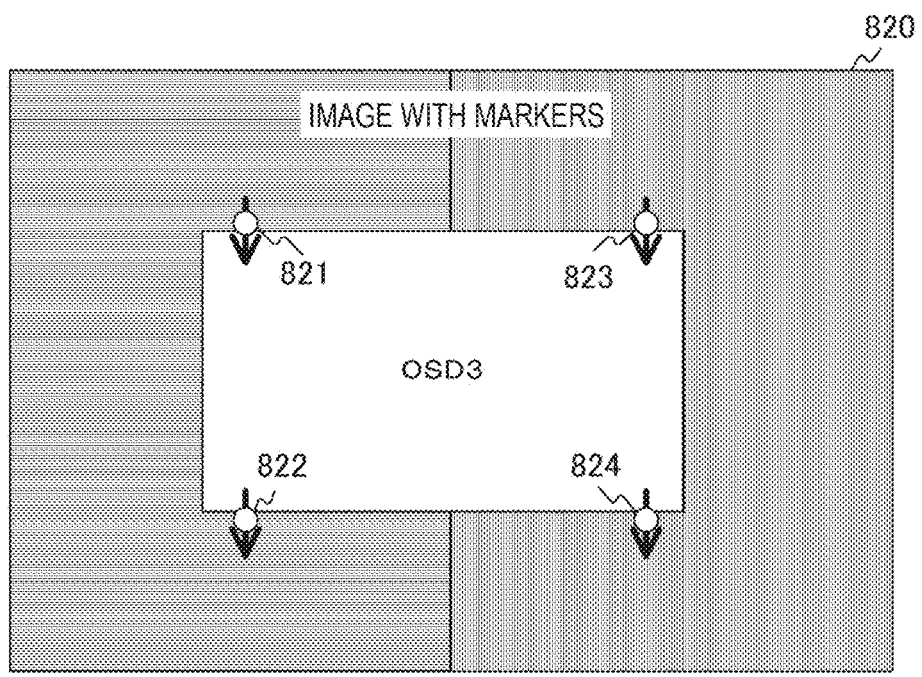
FIG. 12 is a diagram illustrating an example of an image with markers according to a first modified example of the first embodiment.

FIG. 12 is a diagram illustrating an example of an image with markers 820 according to a first modified example of the first embodiment. Scanning is performed in the horizontal direction in the first embodiment, but may be performed in the vertical direction. The image processing apparatus 100 according to the first modified example is different from that of the first embodiment in that the apparatus performs scanning in the vertical direction.

In the image with markers 820 of FIG. 12, an OSD 3 serving as an OSD image is disposed around the center, and marker pixels of the marker value M1 are disposed around the left half obtained by dividing the OSD 3 into a right portion and a left portion. In addition, marker pixels of the marker value M2 are disposed around the right half of the OSD 3.

The image processing unit 300 performs scanning for each of horizontal lines in the vertical direction, for example, from the top to the bottom to detect an upper end and a lower end of the OSD 3.

Figure 13:
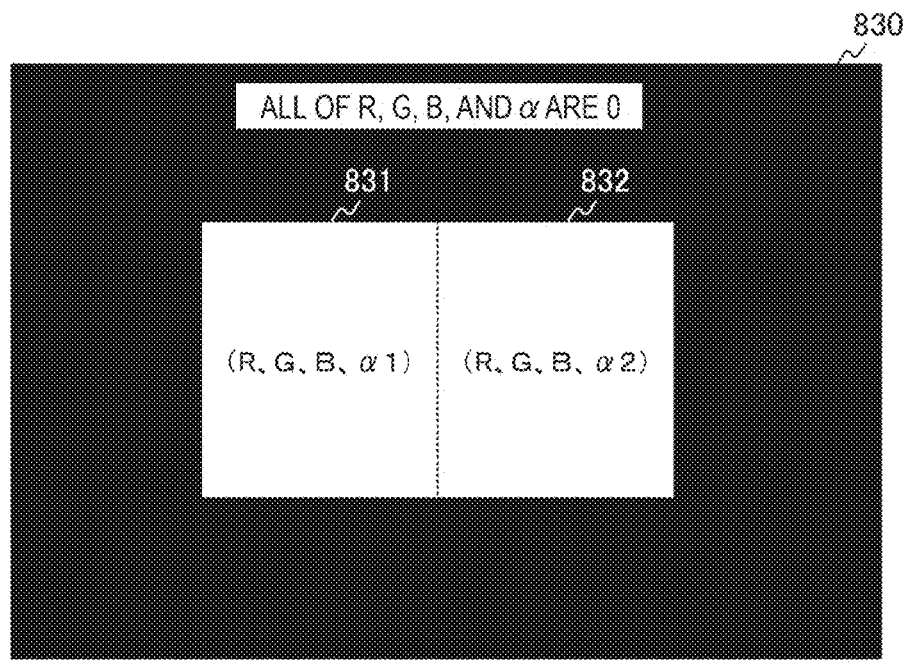
FIG. 13 is a diagram illustrating an example of an OSD image in which a combining ratio is added according to the first modified example of the first embodiment.

FIG. 13 is a diagram illustrating an example of an image 830 in which a combining ratio is added according to the first modified example of the first embodiment. Since the pixels of the marker value M1 are disposed around a region 831 that is the left half obtained by dividing the OSD 3 into the right and left portions, α1 corresponding to the marker value M1 is added to pixels in the region 831. On the other hand, since the pixels of the marker value M2 are disposed around a region 832 of the right half of the OSD 3, α2 corresponding to the marker value M2 is added to pixels in the region 832.

In the first embodiment, the image processing apparatus 100 performs scanning in the horizontal direction. For this reason, the image processing apparatus 100 can set different α values for each of divided regions with straight lines in the horizontal direction, but has difficulty in setting different α values for each of divided regions with straight lines in the vertical direction. On the other hand, as shown in the first modified example, the OSD image can be divided into a plurality of regions with straight lines in the vertical direction by performing scanning in the vertical direction, and different α values can be set for each of the regions.

[Second Modified Example]

Figure 14:
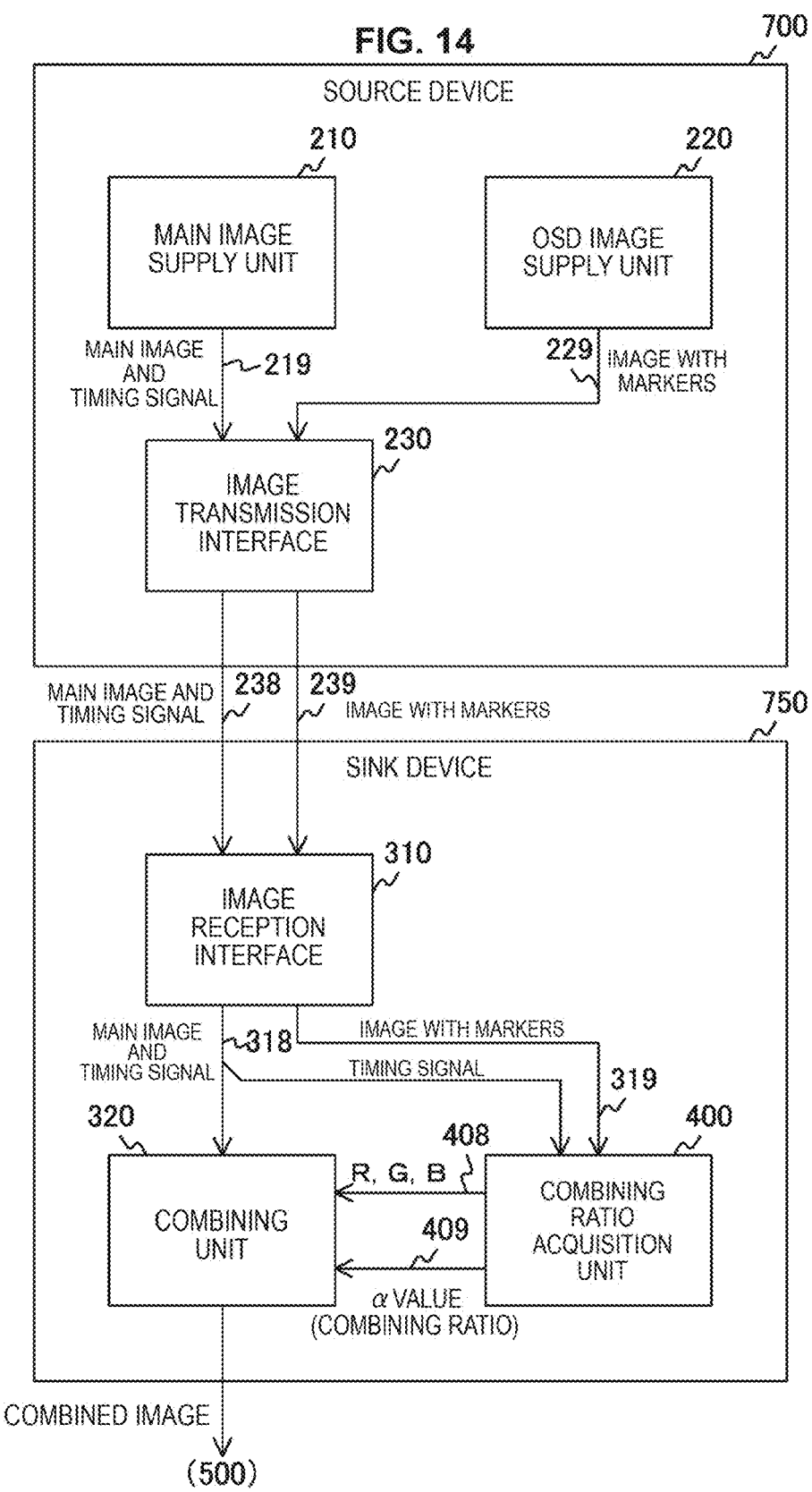
FIG. 14 is a block diagram illustrating a configuration example of an image processing system according to a second modified example of the first embodiment.

FIG. 14 is a block diagram illustrating a configuration example of an image processing system according to a second modified example of the first embodiment. In the first embodiment, the image processing apparatus 100 is configured to include both functions of the image supply unit 200 and the image processing unit 300, however, the functions may be distributed to a plurality of devices. The image processing system of the second modified example is different from that of the first embodiment in that the functions of the image processing apparatus 100 are distributed to a plurality of devices.

The image processing system of the second modified example includes a source device 700 and a sink device 750. The source device 700 includes the main image supply unit 210, the OSD image supply unit 220, and the image transmission interface 230. The sink device 750 includes the image reception interface 310, the combining ratio acquisition unit 400, and the combining unit 320.

[Third Modified Example]

FIG. 15 is a diagram illustrating examples of an OSD image 840 and a mask image 850 according to a third modified example of the first embodiment. The image processing apparatus 100 adds α values to each of pixels in the first embodiment, however, the image processing apparatus may perform image-combining by generating a mask image in which pixel values are set according to α values and performing a mask process using the mask image. The image processing apparatus 100 of the third modified example is different from that of the first embodiment in that the mask image is generated and then the mask process is executed.

a of FIG. 15 is a diagram showing an example of the OSD image 840 according to the third modified example. In the third modified example, an α value is not added to the OSD image and pixel data only has R, G, and B signals. Note that b of the drawing is a diagram showing an example of the mask image 850 according to the third modified example. In the mask image 850, pixel values are set according to α values of each pixel. The α values are indicated as, for example, 8-bit pixel values (luminance values, or the like). The combining ratio acquisition unit 400 generates the images and then supplies the images to the combining unit 320. The combining unit 320 combines the OSD image with the mask image using the mask process.

As described above, according to the third modified example, a data amount of received image data can be reduced in the image processing unit 300 that combines the OSD image in the mask process.

<2. Second Embodiment>

[Configuration Example of an Image Processing System]

Figure 16:
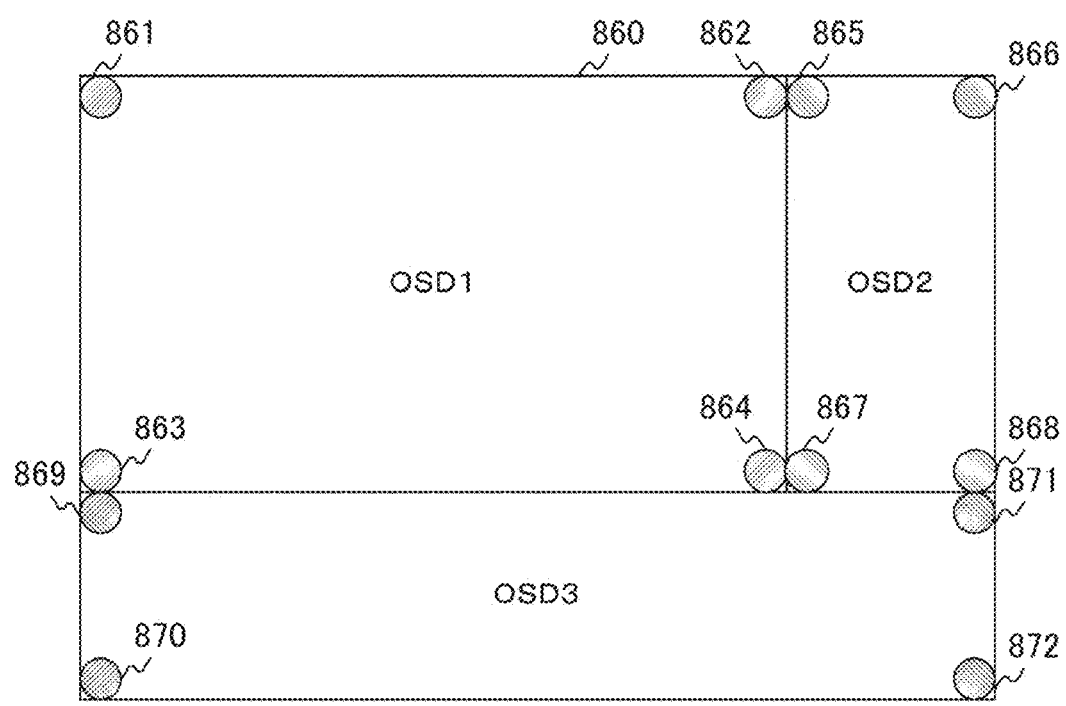
FIG. 16 is a diagram illustrating an example of an image with markers according to a second embodiment.

FIG. 16 is a diagram illustrating an example of an image with markers 860 according to a second embodiment. Marker pixels are disposed in the outer circumference of an OSD image in the first embodiment, however, marker pixels may be disposed in the four corners of an OSD image. The image processing apparatus 100 of the second embodiment is different from that of the first embodiment in that an image with markers in which marker pixels are disposed in the four corners of an OSD image is generated.

For example, as shown in FIG. 16, three OSD images of the OSD 1, the OSD 2, and the OSD 3 are disposed in the image with markers 860. In the four corners of the OSD 1, marker pixels 861, 862, 863, and 864 of the marker value M1 are disposed. In the four corners of the OSD 2, marker pixels 865, 866, 867, and 868 of the marker value M2 are disposed. In the four corners of the OSD 3, marker pixels 869, 870, 871, and 872 of a marker value M3 are disposed. When the marker pixels are disposed in the four corners of the OSD images, it is not necessary to set a space outside of the OSD images for disposing marker pixels, and thus the degree of freedom in disposition of OSD images improves. However, since pixels of the four corners of the OSD images are replaced by the marker pixels, it is desired to interpolate the pixels of the four corners with pixels in the OSD images.

Figure 17:
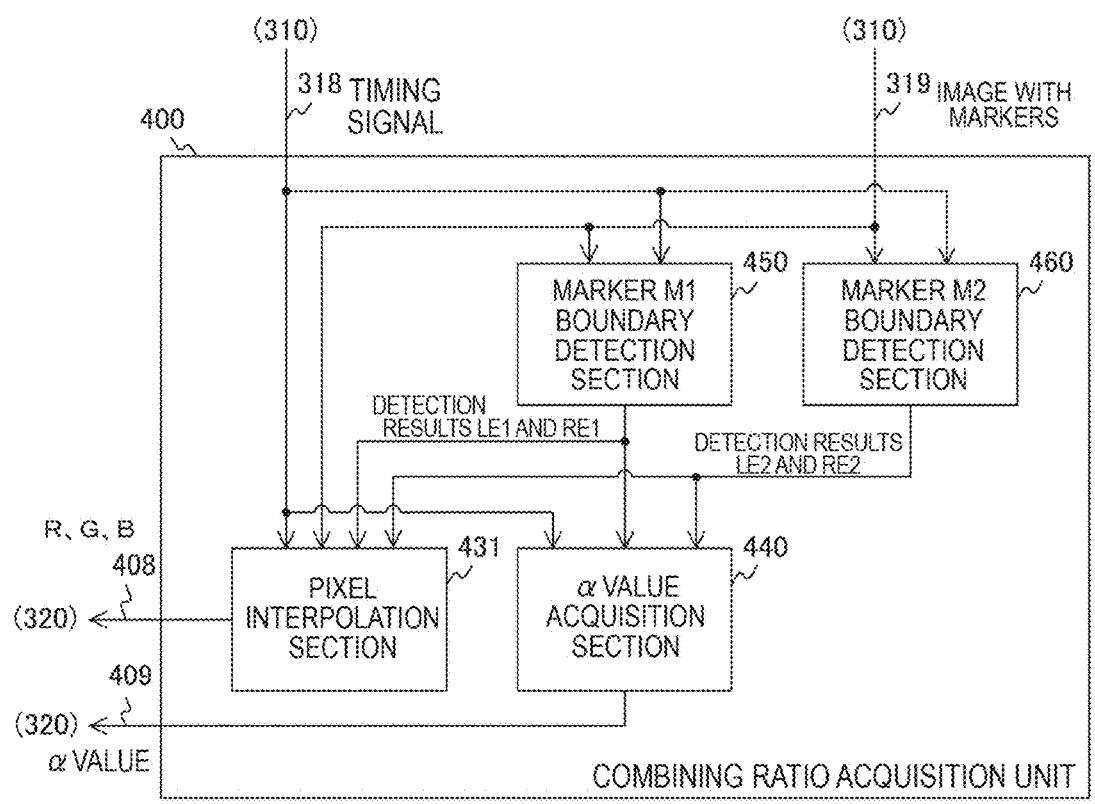
FIG. 17 is a block diagram illustrating a configuration example of a combining ratio acquisition unit according to the second embodiment.

FIG. 17 is a block diagram illustrating a configuration example of the combining ratio acquisition unit 400 according to the second embodiment. The combining ratio acquisition unit 400 of the second embodiment is different from that of the first embodiment in that a marker M1 boundary detection section 450 and a marker M2 boundary detection section 460 are included therein instead of the marker M1 boundary detection section 410 and the marker M2 boundary detection section 420. In addition, the combining ratio acquisition unit 400 of the second embodiment is different from that of the first embodiment in that a pixel interpolation section 431 is included therein instead of the OSD image extraction section 430.

The marker M1 boundary detection section 450 performs a process (scanning) to determine whether or not a pixel value of each of pixels in the horizontal line in an image with markers coincides with the marker value M1 in order. The marker M1 boundary detection section 450 retains the coordinates of a pixel of which the pixel value coincides with the marker value M1 for the first time in the image with markers as left end coordinates. In addition, the marker M1 boundary detection section 450 sets the detection result LE1 of the left end to be a high level each time a pixel of which the coordinates coincide with the left end coordinates is scanned in each of the horizontal lines thereafter.

In addition, the marker M1 boundary detection section 450 retains the coordinates of a pixel of which the pixel value coincides with the marker value M1 for the second time in the image with markers as right end coordinates. In addition, the marker M1 boundary detection section 450 sets the detection result RE1 of the right end to be a high level each time a pixel of which the coordinates coincide with the right end coordinates is scanned in each of the horizontal lines thereafter.

The marker M1 boundary detection section 450 sets the detection result LE1 of the left end to be a low level after a pixel value coincides with the marker value M1 for the third time. Then, after a pixel value coincides with the marker value M1 for the fourth time, the marker M1 boundary detection section 450 sets the detection result RE1 of the right end to be a low level.

The configuration of the marker M2 boundary detection section 460 is the same as that of the marker M1 boundary detection section 450 except that the left and right ends are detected based on the marker value M2 instead of the marker value M1.

The pixel interpolation section 431 detects the positions of the four corners of the OSD image based on detection results of the left end and the right end, and interpolates pixels in the positions with pixels within the OSD image. For example, the average value of pixel values of pixels in the periphery of the four corners of the OSD image is computed, and pixels of pixel values equal to the average value are interpolated. Generally, in the periphery of the four corners of the OSD image, pixel values are not radically changed (in other words, a special frequency is low). For this reason, deterioration of image quality caused by pixel interpolation seldom occurs.

Note that the image processing apparatus 100 may dispose marker pixels in two corners which are diagonal to each other (for example, upper left and lower right) rather than in the four corners.

FIG. 18 is a block diagram illustrating a configuration example of the marker M1 boundary detection section 450 according to the second embodiment. The marker M1 boundary detection section 450 includes a marker value retaining part 451, a number of pixels counting part 452, a coincidence determination part 453, a coincidence time counting part 454, a left end detection part 455, a right end detection part 456, a left end coordinate retaining part 457, and a right end coordinate retaining part 458.

The marker value retaining part 451 retains the marker value M1. The number of pixels counting part 452 counts the number of pixels of a horizontal line. For example, when the data enable signal DE rises, the number of pixels counting part 452 starts counting of the number of pixels in synchronization with a pixel clock pCLK. The number of pixels counting part 452 supplies the count value of the number of pixels to the left end detection part 455 and the right end detection part 456. In addition, when the data enable signal DE falls, the number of pixels counting part 452 sets the count value to an initial value (for example, "0").

The coincidence determination part 453 determines whether or not pixel values of pixels in an image with markers coincide with the marker value M1. The coincidence determination part 453 supplies the coincidence determination result to the coincidence time counting part 454, the left end detection part 455, and the right end detection part 456.

The coincidence time counting part 454 counts the number of times the pixel values coincide with the marker value M1 in the image with markers. Since marker pixels are disposed in the four corners of the OSD image, when the initial value is set to be "0," the count value is any value from 0 to 4. The coincidence time counting part 454 supplies the count value to the left end detection part 455 and the right end detection part 456. Then, the coincidence time counting part 454 sets the count value to be the initial value in synchronization with the vertical synchronization signal Vsync.

The left end detection part 455 detects the left end of the OSD image. When the number of times of coincidence is "0," and a coincidence determination result is a high level, the left end detection part 455 sets the detection result LE1 to be a high level. In addition, the left end detection part 455 causes the count value of the number of pixels at this time to be retained in the left end coordinate retaining part 457 as the left end coordinates.

When the number of times of coincidence is "2," and the count value of the number of pixels coincides with the left end coordinates, the left end detection part 455 sets the detection result LE1 to be a high level. In addition, when the coincidence determination result is a high level, the left end detection part 455 initializes the left end coordinates in the left end coordinate retaining part 457. When the condition for setting the detection result LE1 to be a high level is not met, the detection result LE1 is set to be a low level.

The right end detection part 456 detects the right end of the OSD image. When the number of times of coincidence is "1," and a coincidence determination result is a high level, the right end detection part 456 sets the detection result RE1 to be a high level. In addition, the right end detection part 456 causes the count value of the number of pixels at this time to be retained in the right end coordinate retaining part 458 as the right end coordinates.

When the number of times of coincidence is "2," and the count value of the number of pixels coincides with the right end coordinates, the right end detection part 456 sets the detection result RE1 to be a high level. When the number of times of coincidence is "3" and the coincidence determination result is a high level, the right end detection part 456 sets the detection result RE1 to be a high level and then initializes the right end coordinates in the right end coordinate retaining part 458. When the condition for setting the detection result RE1 to be a high level is not met, the detection result RE1 is set to be a low level.

The left end coordinate retaining part 457 retains the left end coordinates of the OSD image. The right end coordinate retaining part 458 retains the right end coordinates of the OSD image.

FIG. 19 is a table showing an example of operations of the left end detection part 455 according to the second embodiment. When the number of times of coincidence with the marker value M1 is "0" and a coincidence determination result is a low level, the left end detection part 455 outputs the detection result LE1 of the low level. On the other hand, when the number of times of coincidence is "0" and a coincidence determination result is a high level, the left end detection part 455 retains the count value of the number of pixels of this time as left end coordinates and outputs the detection result LE1 of the high level.

When the number of times of coincidence is "1," the left end detection part 455 outputs the detection result LE1 of the low level.

When the number of times of coincidence is "1" and the coincidence determination result is a low level, the left end detection part 455 outputs the detection result LE1 of the high level when the count value of the number of pixels coincides with the left end coordinates. When the count value of the number of pixels does not coincide with the left end coordinates, the left end detection part 455 outputs the detection result LE1 of the low level. On the other hand, when the number of times of coincidence is "1" and the coincidence determination result is a high level, the left end detection part 455 initializes the left end coordinates and outputs the detection result LE1 of the high level.

When the number of times of coincidence is "3" or "4," the left end detection part 455 outputs the detection result LE1 of the low level.

FIG. 20 is a table showing an example of operations of the right end detection part 456 according to the second embodiment. When the number of times of coincidence with the marker value M1 is "0," the right end detection part 456 outputs the detection result RE1 of the low level.

When the number of times of coincidence is "1" and the coincidence determination result is a low level, the right end detection part 456 outputs the detection result RE1 of the low level. On the other hand, when the number of times of coincidence is "1" and the coincidence determination result is a low level, the right end detection part 456 retains the count value of the number of pixels of this time as right end coordinates and outputs the detection result RE1 of the high level.

When the number of times of coincidence is "2," the right end detection part 456 outputs the detection result RE1 of the high level when the count value of the number of pixels coincides with the right end coordinates. When the count value of the number of pixels does not coincide with the right end coordinates, the right end detection part 456 outputs the detection result RE1 of the low level.

When the number of times of coincidence is "3" and the coincidence determination result is a low level, the right end detection part 456 outputs the detection result RE1 of the low level. On the other hand, when the number of times of coincidence is "3" and the coincidence determination result is a high level, the right end detection part 456 initializes the right end coordinates and then outputs the detection result RE1 of the high level.

When the number of times of coincidence is "4," the right end detection part 456 outputs the detection result RE1 of the low level.

As described above, according to the second embodiment of the present technology, since marker pixels are disposed in the four corners of the OSD image, it is not necessary to set a space to dispose the marker pixels outside of the OSD image. Accordingly, the degree of freedom in disposition of an OSD image improves.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray (registered trademark) disc can be used.

Additionally, the present technology may also be configured as below.

(1) An image processing apparatus including:

an image reception unit configured to receive an image with markers including a sub image and marker pixels each indicating, using a pixel value, a combining ratio of a main image and the sub image that is combined with the main image;

a combining ratio acquisition unit configured to acquire the combining ratio indicated by a pixel value of the marker pixel in the image with markers; and a combining unit configured to combine the main image and the sub image based on the acquired combining ratio.

(2) The image processing apparatus according to (1), wherein the image with markers is an image in which the sub image is disposed in a partial region within the image with markers and the marker pixels are disposed in a position for specifying the partial region, wherein the combining ratio acquisition unit acquires the combining ratio in the image with markers, detects the marker pixels, and specifies the partial region based on the detected position, and wherein the combining unit combines the sub image in a region within the main image corresponding to the specified partial region.

(3) The image processing apparatus according to (2), wherein a pixel value of the marker pixel is a specific value that is not used as a pixel value in the sub image, and wherein the combining ratio acquisition unit detects, as the marker pixel, a pixel of which the pixel value coincides with the specific value in the image with markers.

(4) The image processing apparatus according to (2), wherein the image with markers includes the marker pixels arrayed in a row along the outer circumference of the partial region.

(5) The image processing apparatus according to (2), wherein the partial region is a rectangular region, and wherein the marker pixels are disposed in a plurality of corners of the partial region.

(6) The image processing apparatus according to (5), wherein the combining ratio acquisition unit further includes a pixel interpolation section configured to interpolate pixels in the sub image in the plurality of corners.

(7) A source device including:

an image generation unit configured to generate an image with markers including a sub image and marker pixels each indicating, using a pixel value, a combining ratio of a main image and the sub image combined with the main image; and an image transmission unit configured to transmit the image with markers.

(8) An image processing system including:

an image generation unit configured to generate an image with markers including a sub image and marker pixels each indicating, using a pixel value, a combining ratio of a main image and the sub image combined with the main image;

an image transmission unit configured to transmit the image with markers;

an image reception unit configured to receive the image with markers;

a combining ratio acquisition unit configured to acquire the combining ratio indicated by a pixel value of the marker pixel in the image with markers; and a combining unit configured to combine the sub image with the main image based on the acquired combining ratio.

(9) An image processing method including:

receiving, by an image reception unit, an image with markers including a sub image and marker pixels each indicating, using a pixel value, a combining ratio of a main image and the sub image combined with the main image;

acquiring, by a combining ratio acquisition unit, the combining ratio indicated by the pixel value of the marker pixel in the image with markers; and combining, by a combining unit, the sub image with the main image based on the acquired combining ratio.

(10) A program causing a computer to realize:

receiving, by an image reception unit, an image with markers including a sub image and marker pixels each indicating, using a pixel value, a combining ratio of a main image and the sub image combined with the main image;

acquiring, by a combining ratio acquisition unit, the combining ratio indicated by the pixel value of the marker pixel in the image with markers; and combining, by a combining unit, the sub image with the main image based on the acquired combining ratio.

What is claimed is:

1. An image processing apparatus comprising:
    processing circuitry that functions as:
    an image reception unit configured to receive an image with markers, the image with markers including a sub image and marker pixels, each of the marker pixels indicating, using a pixel value having a specific value that is not used as a pixel value in the sub image, a combining ratio of a main image and the sub image that is combined with the main image, wherein the sub image is disposed in a partial region within the image with markers, wherein the marker pixels are disposed in positions for specifying the partial region;
    a combining ratio acquisition unit configured to acquire the combining ratio indicated by a pixel value of the marker pixel in the image with markers, wherein the combining ratio acquisition unit detects the positions of the marker pixels and specifies edges of the partial region based on the detected positions, and wherein the combining ratio acquisition unit detects, as the marker pixel, a pixel of which the pixel value coincides with the specific value in the image with markers; and
    a combining unit configured to combine the main image and the sub image based on the acquired combining ratio, wherein the combining unit combines the sub image in a region within the main image corresponding to the specified partial region.

2. The image processing apparatus according to claim 1, wherein the image with markers includes the marker pixels arrayed in a row along the outer circumference of the partial region.

3. The image processing apparatus according to claim 1, wherein the partial region is a rectangular region, and wherein the marker pixels are disposed in a plurality of corners of the partial region.

4. The image processing apparatus according to claim 3, wherein the combining ratio acquisition unit further includes a pixel interpolation section configured to interpolate pixels in the sub image in the plurality of corners.

5. A source device comprising:
    processing circuitry that functions as:
    an image generation unit configured to generate an image with markers, the image with markers including a sub image and marker pixels, each of the marker pixels indicating, using a pixel value having a specific value that is not used as a pixel value in the sub image, a combining ratio of a main image and the sub image combined with the main image, wherein the sub image is disposed in a partial region within the image with markers, wherein the marker pixels are disposed in positions for specifying the partial region; and
    an image transmission unit configured to transmit the image with markers.

6. An image processing system comprising:
    processing circuitry that functions as:
    an image generation unit configured to generate an image with markers, the image with markers including a sub image and marker pixels, each of the marker pixels indicating, using a pixel value having a specific value that is not used as a pixel value in the sub image, a combining ratio of a main image and the sub image combined with the main image, wherein the sub image is disposed in a partial region within the image with markers, wherein the marker pixels are disposed in positions for specifying the partial region;
    an image transmission unit configured to transmit the image with markers;
    an image reception unit configured to receive the image with markers;
    a combining ratio acquisition unit configured to acquire the combining ratio indicated by a pixel value of the marker pixel in the image with markers, wherein the combining ratio acquisition unit detects the positions of the marker pixels and specifies edges of the partial region based on the detected positions, and wherein the combining ratio acquisition unit detects, as the marker pixel, a pixel of which the pixel value coincides with the specific value in the image with markers; and
    a combining unit configured to combine the sub image with the main image based on the acquired combining ratio, wherein the combining unit combines the sub image in a region within the main image corresponding to the specified partial region.

7. An image processing method comprising:
    receiving, by an image reception unit, an image with markers, the image with markers including a sub image and marker pixels, each of the marker pixels indicating, using a pixel value having a specific value that is not used as a pixel value in the sub image, a combining ratio of a main image and the sub image combined with the main image, wherein the sub image is disposed in a partial region within the image with markers, wherein the marker pixels are disposed in positions for specifying the partial region;
    acquiring, by a combining ratio acquisition unit, the combining ratio indicated by the pixel value of the marker pixel in the image with markers, wherein the combining ratio acquisition unit detects the positions of the marker pixels and specifies edges of the partial region based on the detected positions, and wherein the combining ratio acquisition unit detects, as the marker pixel, a pixel of which the pixel value coincides with the specific value in the image with markers; and
    combining, by a combining unit, the sub image with the main image based on the acquired combining ratio, wherein the combining unit combines the sub image in a region within the main image corresponding to the specified partial region.

8. A non-transitory computer-readable storage device encoded with computer-executable instructions that, when executed by processing circuitry, perform a method comprising:

receiving, by an image reception unit, an image with markers, the image with markers including a sub image and marker pixels, each of the marker pixels indicating, using a pixel value having a specific value that is not used as a pixel value in the sub image, a combining ratio of a main image and the sub image combined with the main image, wherein the sub image is disposed in a partial region within the image with markers, wherein the marker pixels are disposed in positions for specifying the partial region;

acquiring, by a combining ratio acquisition unit, the combining ratio indicated by the pixel value of the marker pixel in the image with markers, wherein the combining ratio acquisition unit detects the positions of the marker pixels and specifies edges of the partial region based on the detected positions, and wherein the combining ratio acquisition unit detects, as the marker pixel, a pixel of which the pixel value coincides with the specific value in the image with markers; and combining, by a combining unit, the sub image with the main image based on the acquired combining ratio, wherein the combining unit combines the sub image in a region within the main image corresponding to the specified partial region.

* * * * *